United States Patent
Swinford

(10) Patent No.: US 9,238,284 B2
(45) Date of Patent: Jan. 19, 2016

(54) METHODS FOR FORMING A HEAT EXCHANGER AND PORTIONS THEREOF

(75) Inventor: Mark Douglas Swinford, Centerville, OH (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 630 days.

(21) Appl. No.: 13/331,179

(22) Filed: Dec. 20, 2011

(65) Prior Publication Data
US 2013/0152392 A1    Jun. 20, 2013

(51) Int. Cl.
| | |
|---|---|
| B23P 15/26 | (2006.01) |
| B23H 7/02 | (2006.01) |
| F28D 1/02 | (2006.01) |
| F02K 3/115 | (2006.01) |
| F28F 3/04 | (2006.01) |
| B23H 9/00 | (2006.01) |
| B23H 9/14 | (2006.01) |

(52) U.S. Cl.
CPC . *B23P 15/26* (2013.01); *B23H 7/02* (2013.01); *B23H 9/00* (2013.01); *F02K 3/115* (2013.01); *F28D 1/0246* (2013.01); *F28F 3/048* (2013.01); *B23H 9/14* (2013.01); *B23P 2700/10* (2013.01); *Y02T 50/671* (2013.01); *Y10T 29/4935* (2015.01)

(58) Field of Classification Search
CPC ...... B21D 53/022; B21D 53/08; B23P 15/26; B23P 2700/10; B23H 7/02; B23H 9/00; B23H 9/14; B26D 3/28; B26D 3/282; F28F 3/04; F28F 3/048; F28F 1/325; F28F 1/22; F28F 1/12; F28D 1/0246; Y10T 29/4925; Y02T 50/671
USPC ........... 29/890.03, 890.046, 890.045, 890.05, 29/557, 558, 17.8; 165/151, 171, 179, 165/181–184, 80.3, 185; 83/861, 862, 13; 257/E23.103, E23.109; 138/38
See application file for complete search history.

(56) References Cited

U.S. PATENT DOCUMENTS

| | | | |
|---|---|---|---|
| 3,886,639 A * | 6/1975 | Pasternak | 72/325 |
| 5,012,646 A | 5/1991 | Speer | |
| 6,341,651 B1 * | 1/2002 | Ohta | 165/185 |
| 6,390,181 B1 * | 5/2002 | Hall et al. | 165/80.3 |
| 6,675,881 B1 * | 1/2004 | Rago | 165/154 |
| 7,610,948 B2 * | 11/2009 | Huang | 165/80.3 |
| 2004/0228781 A1 | 11/2004 | Tonkovich | |
| 2006/0157234 A1 | 7/2006 | Golecki | |
| 2008/0216315 A1 * | 9/2008 | Boman | 29/888.01 |
| 2010/0108289 A1 | 5/2010 | Guinan | |

FOREIGN PATENT DOCUMENTS

| | | |
|---|---|---|
| EP | 1104015 A2 | 5/2001 |
| EP | 1916399 A2 | 4/2008 |
| JP | 2002307245 A | 10/2002 |

OTHER PUBLICATIONS

Search Report and Written Opinion from corresponding PCT Application No. PCT/US2012/056879, dated Jun. 12, 2013.

* cited by examiner

*Primary Examiner* — Sarang Afzali
(74) *Attorney, Agent, or Firm* — GE Global Patent Operations; William S. Munnerlyn

(57) ABSTRACT

Methods of forming a heat exchanger from a metal body made from a material having a melting temperature greater than 660° C. with the metal body having opposing first and second surfaces and at least one fluid passageway formed in the metal body so that fluid may be passed through the fluid passageway and heat from the fluid may be dissipated through a plurality of fins.

10 Claims, 8 Drawing Sheets

METHODS FOR FORMING A HEAT EXCHANGER AND PORTIONS THEREOF

GOVERNMENT LICENSE RIGHTS

This invention was made with Government support under Contract No. FA8650-07-C-2802 awarded by the U.S. Air Force, AFMC. The Government has certain rights in this invention.

BACKGROUND OF THE INVENTION

Jet engines for military and commercial applications demand improved efficiency, in terms of specific fuel consumption. The efficiency may be raised by increasing the exhaust gas temperature of the airflow entering the turbine stage of the engine. This increased temperature must be compensated for in terms of internal cooling of the nozzle and turbine blades of the turbine section. One method to cool the nozzles and turbine blades is to extract compressed air from the last compressor stage, prior to the combustion stage, cool this air, and re-inject it into the hollow cavities of the nozzles and turbine blades. The air may be cooled via an air-to-air heat exchanger that is located within the fan bypass annulus of the engine, in order to benefit from relatively colder temperature air flowing past the heat exchanger. Such a heat exchanger would typically have external fins, in order to increase the surface area of the exchanger, and to improve the external airflow mixing. In transferring heat to the fan bypass flow of the engine, the finned heat exchanger may typically include internal fluid passages for transporting the high pressure air extracted from a final compressor stage.

BRIEF DESCRIPTION OF THE INVENTION

In one embodiment, a method of forming a fluid passage in a heat exchanger having a metal body made from a material having a melting temperature greater than 660° C. includes cutting an access opening into the metal body, with the access opening spanning a dimension of the metal body, removing material from the metal body along the access opening to form a passageway in the metal body that extends along the access opening and is accessible through the access opening, and closing the access opening to form the fluid passage.

In another embodiment a method of forming a heat exchanger from a metal body made from a material having a melting temperature greater than 660° C. includes forming at least one fluid passageway in the metal body by cutting an access opening into the first surface of the metal body, with the access opening spanning a dimension of the first surface, removing material from the metal body along the access opening to form a fluid passageway in the metal body that extends along the access opening and is accessible through the access opening, and closing the access opening to form the fluid passageway, and forming at least one fin projecting from the second surface by forming a nick in the second surface, introducing a skiving blade into the nick, and advancing the skiving blade from the nick into the material forming a fin that remains attached to the metal body, wherein fluid may be passed through the fluid passageway and heat from the fluid may be dissipated through the fin.

DESCRIPTION OF EMBODIMENTS OF THE INVENTION

Figure 1:
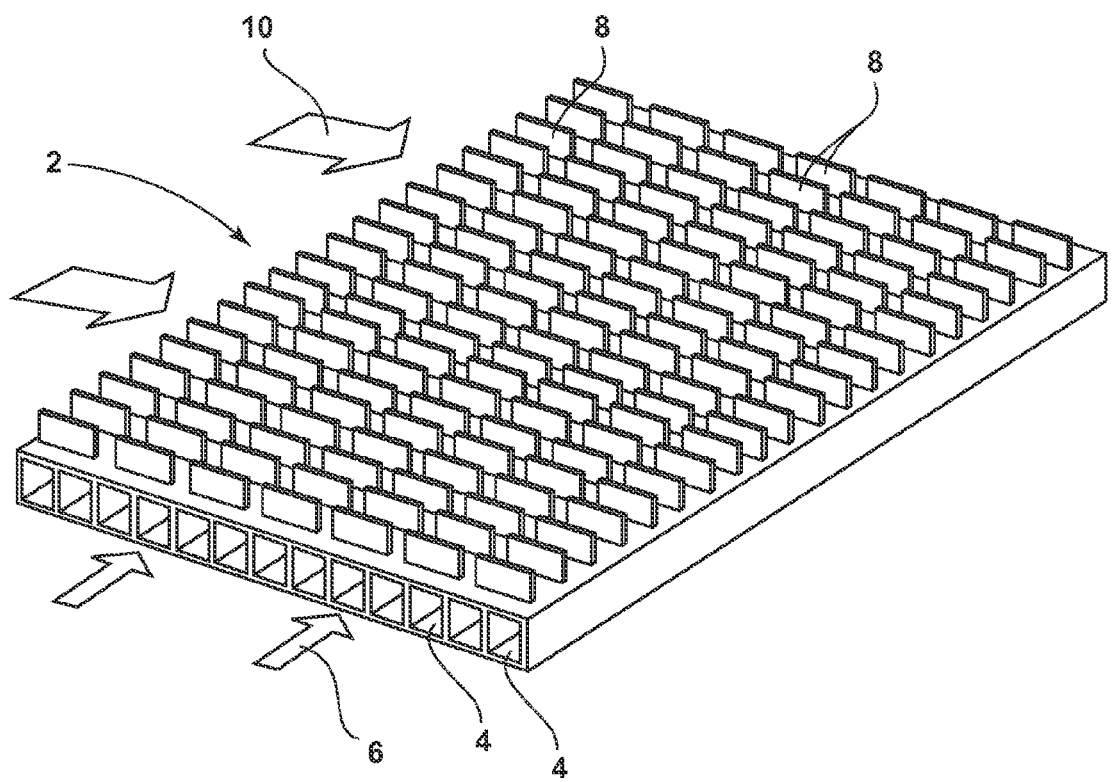
FIG. 1 is a schematic perspective view illustrating a portion of a heat exchanger.
Figure 2:
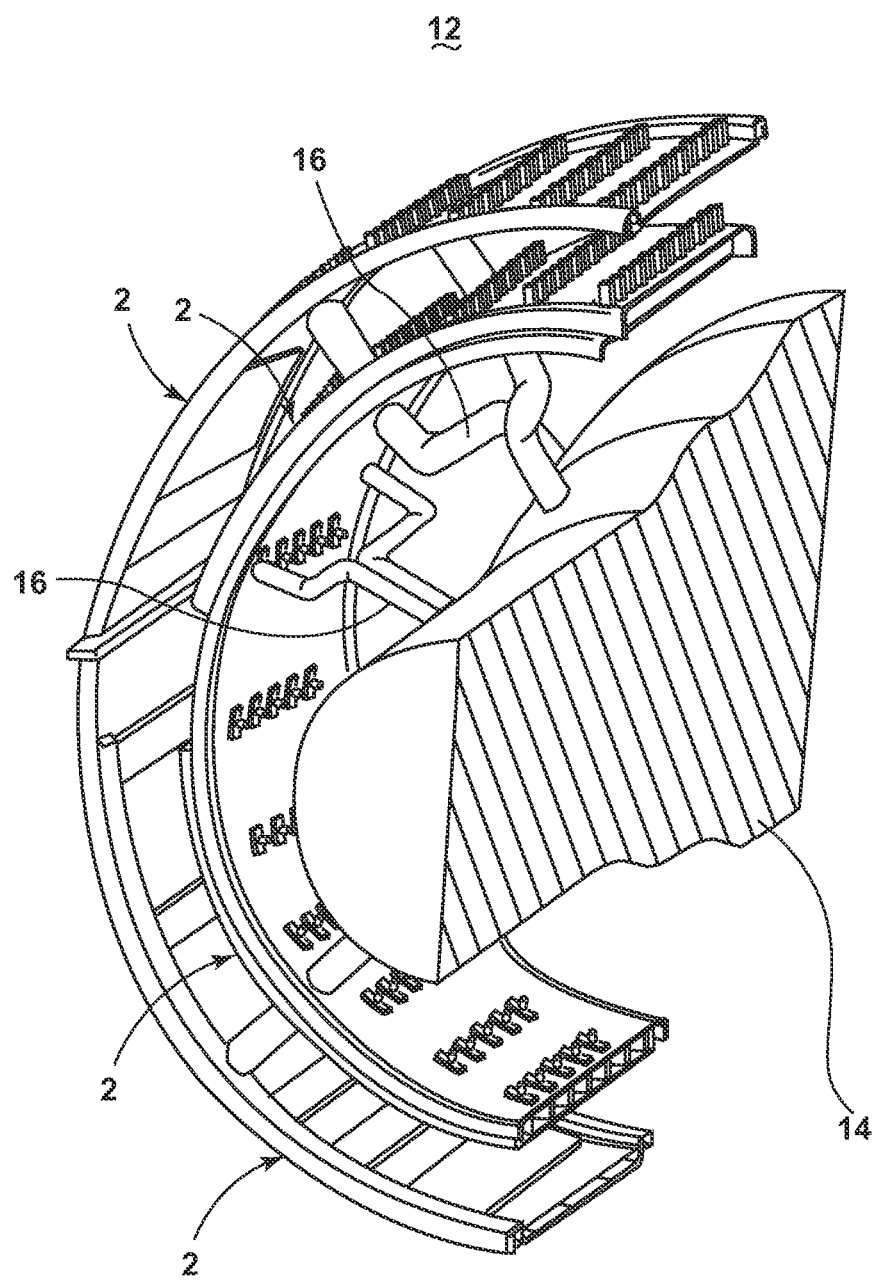
FIG. 2 is a schematic cross-sectional view illustrating heat exchanger portions forming a heat exchanger assembly around an engine.

Jet engines, such as turbine engines, pose unique thermal management challenges and in cases where compressor bleed air is used within the heat exchanger, the thermal management challenges are quite extreme. In such a situation, a heat exchanger may be designed to accept a flow of compressor bleed air through a series of tubes to transfer the heat from the compressor bleed air to the heat exchanger. A cooler air flow is provided typically from fan bypass air over the top of the heat exchanger to cool the heat exchanger. FIG. 1 illustrates a schematic example of a heat exchanger portion 2 that can be used to dissipate the heat from compressor bleed air. The heat exchanger portion has internal passageways or conduits 4, which may be used for carrying fluid 6, such as the compressor bleed air, and integral fins 8 over which cooling air 10 may be passed. As illustrated in FIG. 2, various heat exchanger portions 2 may be used to form a heat exchanger assembly 12, which may be used to at least partially envelope or fill a portion of a jet engine 14 and various suitable inlet and outlet headers 16 may be shared between the various heat exchanger portions 2 to convey the fluid 6.

The compressor bleed air temperature may be quite high relative to what is expected in normal heat exchanger environments. In many cases, the temperature is sufficiently high that typical heat exchanger materials, especially those used in aircraft, are not acceptable. For example, aluminum is typically a preferred material for aircraft heat exchangers because of its light weight and thermal properties. However, the temperature and pressure of compressor bleed air, 704° C. (1,300° F.) and 1,200 psi, can be too great for aluminum.

Thus, the remainder of the application will focus on forming a heat exchanger having a metal body made from a material having a melting temperature greater than aluminum, which has a melting temperature of 660° C. A nearly pure nickel material, such as nickel 201, may be used but it is a hard material to form by machining, extruding, etc. and extrusion from such base stock to the dimensions needed for the internal passageways of such applications is not currently possible. For example, it has been determined that for heat transfer purposes a suitable conduit size within the heat exchanger would be on the order of 0.050 inches to 0.100 inches with a wall thickness of about 0.030 inches. It has been determined that such a nickel material may be extruded with conduit sizes having dimensions approximately ten times larger than what is needed; thus, using an extrusion for the nickel base stock is not currently possible. Other methods of forming the base stock, such as casting, have problems such as porosity and wall thinning, which can negatively impact the structural integrity of the internal passageways. The high pressure of the internal fluid creates large hoop stresses, which places the walls of the passageways under high stress.

Figure 3:
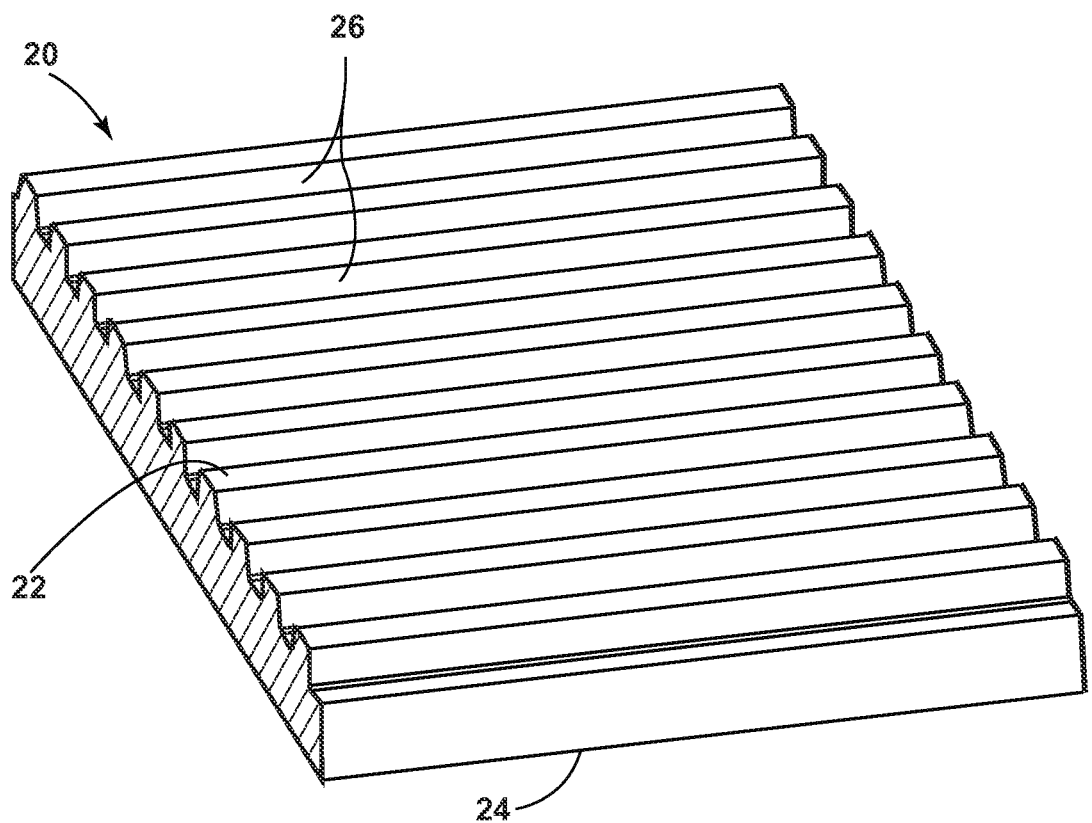
FIG. 3 is a perspective view illustrating a metal body which may be used in forming a heat exchanger in accordance with one embodiment of the invention.

FIG. 3 is a perspective view illustrating a metal body 20, which forms the basis of the heat exchanger base material, and is made from a material having a melting temperature greater than 660° C. The body 20 may be used in forming a heat exchanger with the desired heat transfer coefficient and conduit dimensions in accordance with one embodiment of the invention. The metal body 20 may include a first surface shown as an upper surface 22 and a second surface shown as a lower surface 24, which opposes the upper surface 22. It will be understood that the orientation of the metal body 20 may be changed such that the first and second surfaces may correlate to the lower and upper surfaces without detracting from the description herein. It is contemplated that multiple projections 26 may be included in the metal body 20 and may form a portion of the upper surface 22. Any number of multiple projections 26 may be included and the multiple projections 26 may take a variety of shapes and sizes including that the widths of the multiple projections 26 and their spacing may be varied. Such multiple projections 26 may be formed in any suitable manner including by way of non-limiting examples that the multiple projections 26 may be ridges machined from metal base stock forming the metal body 20 and that the multiple projections 26 may be brazed to the metal body 20.

Figure 4:
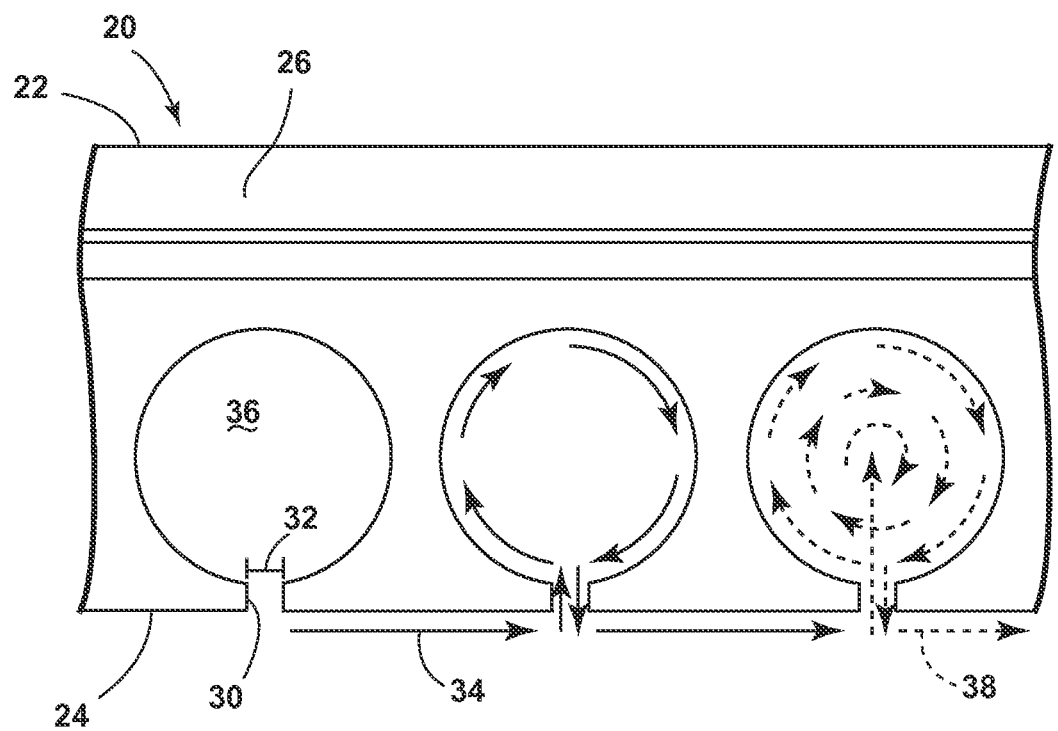
FIG. 4 is a schematic cross-sectional view illustrating a wire path used to form an access opening in the metal body of FIG. 3 in accordance with another embodiment of the invention.

According to an embodiment of a method of the invention, fluid passages may be formed in the metal body 20 by cutting an access opening into the metal body 20, removing material from the metal body 20, and closing the access opening to form a fluid passage. As illustrated in FIG. 4, an embodiment of the method may include cutting an access opening 30 into the metal body 20 with the access opening 30 spanning a dimension 32 of the metal body 20. Cutting the access opening 30 may be done in any suitable manner and by way of non-limiting example, it is contemplated that cutting the access opening 30 may be accomplished with an electric discharge machining (EDM) wire 34 shown schematically as an arrow whereby a desired shape is obtained using electrical discharges (sparks). More specifically, the access opening 30 may be cut from the metal body 20 by feeding a thin EDM wire 34 through the metal body 20 while it is submerged in a tank of dielectric fluid.

Material may then be removed from the metal body 20 along the access opening 30 to form a passageway 36 in the metal body 20 that extends along the access opening 30 and is accessible through the access opening 30. Removing material from the metal body 20 may include cutting the material from the metal body 20 by passing a cutting tool through the access opening 30. By way of non-limiting example, it is also contemplated that passing a tool through the access opening 30 may include passing an EDM wire 34 through the access opening 30 and cutting the material with the EDM wire 34.

Depending upon the size of the passageway to be formed, the size of the access opening 30 and the size of the EDM wire 34, cutting the material with the EDM wire 34 may include moving the EDM wire 34 in a path consistent with the exterior shape of the passageway to be formed as shown by the solid arrows. By way of a further, not limiting example, cutting the material with the EDM wire 34 may include moving the EDM wire 34 to a middle area of what is to be the passageway 36 and moving the EDM wire 34 in a path that increases in distance from the middle area. This path of the EDM wire 34 is illustrated schematically with dotted arrows 38. It is also contemplated that multiple EDM wires 34 may be used to form the passageway 36, in order to form the passageways 36 more quickly.

It is contemplated that removing material from the metal body 20 may include removing sufficient material such that the passageway 36 has a cross section greater than the access opening 30. The cross section of the passageway 36 may be any suitable shape including by way of non-limiting example that it may be substantially circular as illustrated.

Figure 5:
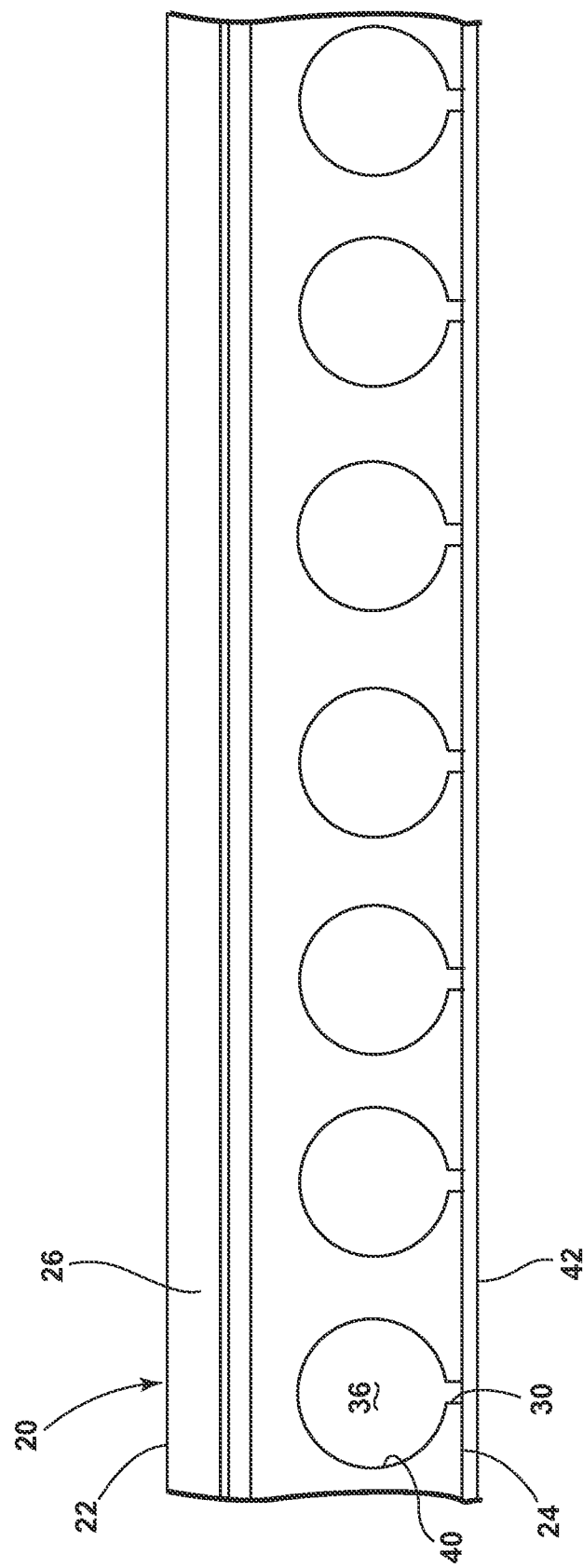
FIG. 5 is a schematic cross-sectional view illustrating a method of closing the access openings formed by the wire path used in FIG. 4 according to an embodiment of the invention.

After the material has been removed and the passageway 36 is the desired cross section, the access opening 30 may be closed in any suitable manner to form a fluid passageway 40. By way of non-limiting example the access opening 30 may be welded closed. By way of additional non-limiting example, closing the access opening 30 may include attaching a metal closing element 42 to the lower surface 24. This may be done in any suitable manner including by brazing the metal closing element 42 to the lower surface 24. The result of such a process may be seen in FIG. 5 wherein a close-out sheet is illustrated as forming the metal closing element sheet 42.

Prior to closing the access openings 30 as described above that the metal body 20 may be shaped. By way of non-limiting example the metal body 20 may be rolled into a cylindrical shape. After such shaping the access openings 30 may be closed. Again, by way of non-limiting example, this may include the metal closing element in the form of a closeout sheet 42 being brazed to the metal body 20 in a flat or curved condition.

Figure 6:
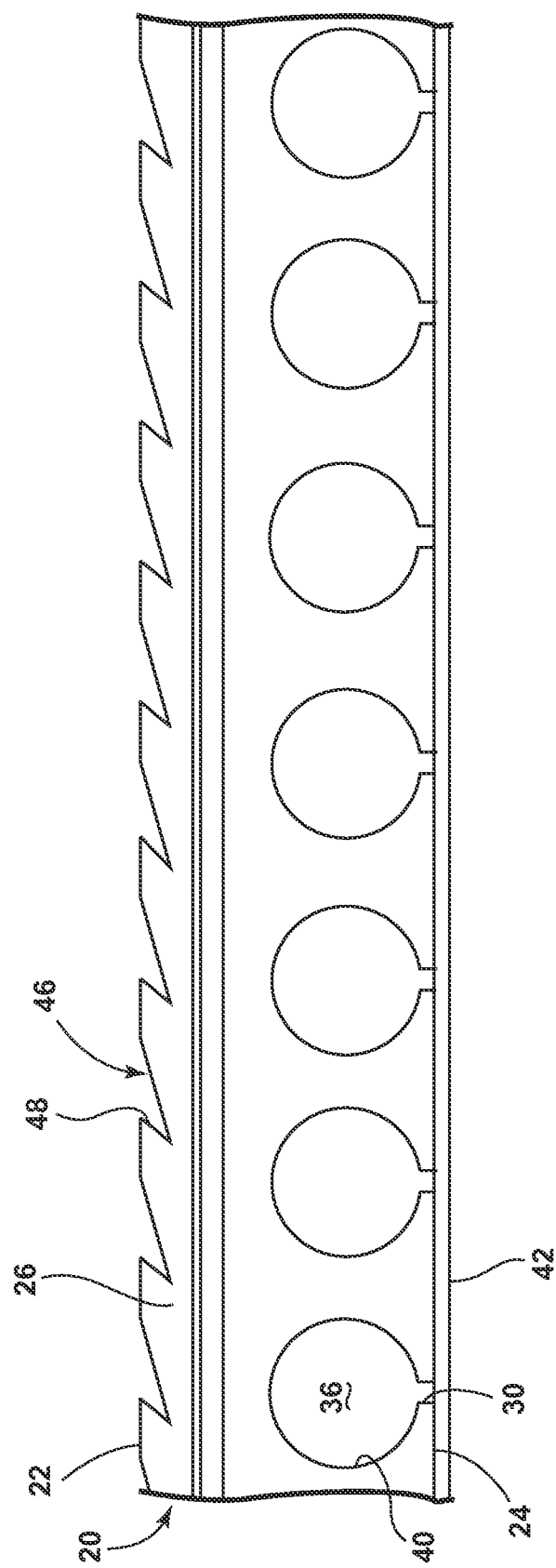
FIG. 6 is a schematic side view of a portion of the metal body of FIG. 5 with nicks formed in a surface of the metal body according to another embodiment of the invention.

It is contemplated that before shaping the body 20 into a curved condition, fins may be formed in the upper surface 22 to aid in the transfer of heat from fluid circulating within the fluid passages 40 to the environment surrounding the metal body 20. The fins may be formed in any suitable manner, for example, FIG. 6 is a schematic side view of a portion of the metal body 20 with multiple nicks 46 formed in the upper surface 22 of the metal body 20 to aid in forming at least one fin projecting from the upper surface 22 according to yet another embodiment of the invention. It is contemplated that the nick 46 in the upper surface 22 may be formed in any suitable manner. By way of non-limiting examples, forming the nick 46 may include etching the upper surface 22, cutting the upper surface 22 with an EDM wire (not shown) or cutting the upper surface 22 with a milling cutter (not shown). It is also contemplated that the nick 46 may take a variety of shapes and cross-sections. By way of non-limiting examples, the nick 46 may be a small indentation formed in the upper surface 22, a groove formed in the upper surface 22, or a deeper recess formed in the upper surface 22. It has been contemplated that the nicks 46 may be on the order of 0.010 inches to 0.015 inches deep. As a further example, forming such a recess may include forming an acute ledge 48 in the metal body 20 that is oriented in a certain direction with respect to the upper surface 22. Such an acute ledge 48 is illustrated as being directed toward a direction of advancement of a skiving blade (not shown) which may be used in forming a fin.

Figure 7:
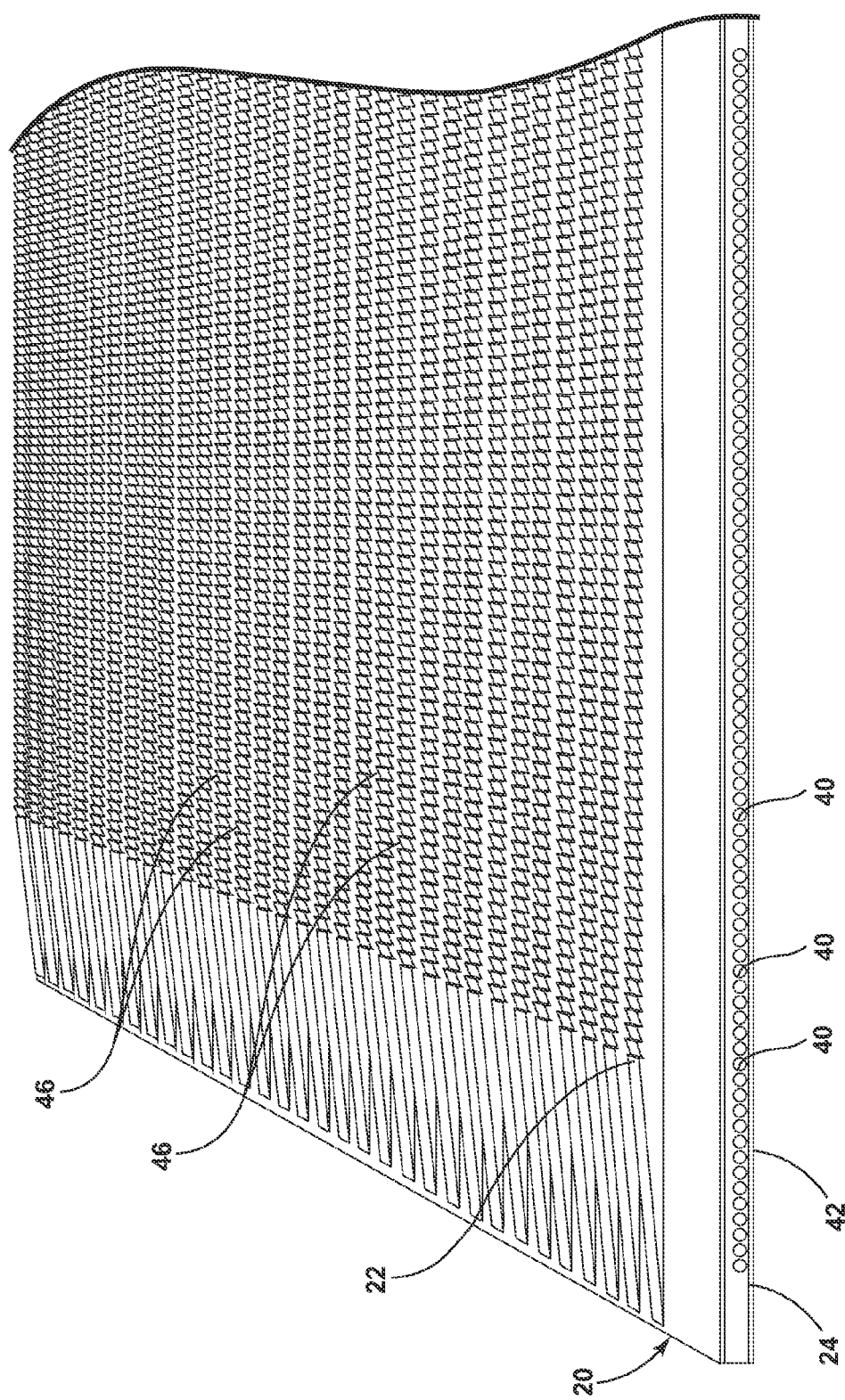
FIG. 7 is a perspective view of the metal body of FIG. 5 with rows of nicks formed according to yet another embodiment of the invention.
Figure 8:
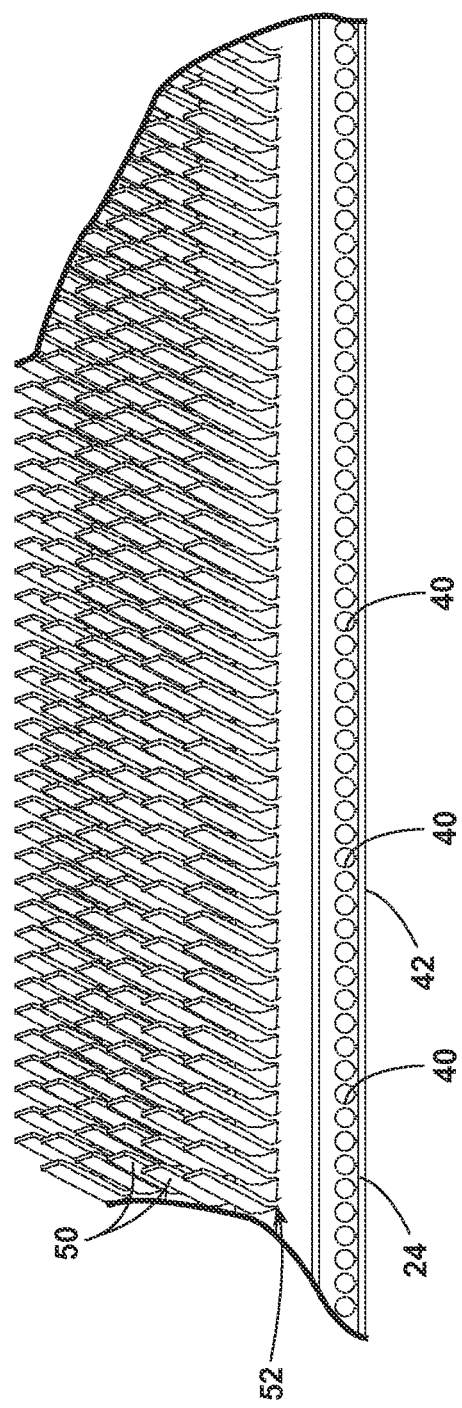
FIG. 8 is a perspective view of the metal body of FIG. 7 wherein fins have been formed according to a further embodiment of the invention.

As illustrated in FIG. 7, forming the nick 46 may include forming a plurality of nicks 46 in a row. Forming the plurality of nicks 46 in a row may include forming multiple rows of nicks 46 on the multiple projections 26 or may include forming multiples rows of nicks 46 along the length of one of the multiple projections 26. In the instant illustration rows of nicks 46 are illustrated as being along all of the multiple projections 26 for a majority of the length of multiple projections 26.

After the desired nicks 46 are formed, a skiving blade may be introduced into the nick 46 and the skiving blade may be advanced from the nick 46 into the metal body 20 such that a fin 50 is formed. Such fins 50 remained attached to the metal body 20. This may be done for each of the nicks 46 until a plurality of fins 50 are formed on the metal body 20. Such a process may be done in any suitable manner including by machine which may exert a force on the skiving tool as it is driven into the nick 46.

After the fins 50 have been formed the metal body 20 may be trimmed in any suitable way such that at least a section of a heat exchanger 52 may be formed. The section of heat exchanger 52 formed may include the fluid passages 40 and the fins 50 and may be shaped and combined in any suitable manner with additional sections of any suitable shape and size such that a heat exchanger or heat exchanger assembly of varying proportions may be made and may be used with a variety of different engines. During operation, fluid such as compressor bleed air may be passed through the fluid passages 40 and heat from the fluid may be dissipated through the fins 50 to the air flowing by the fins 50.

The above described embodiments provide for a variety of benefits including that very small diameter fluid passage may be readily made in base stock having a melting temperature greater than 660° C. The dimensions of the fluid passage may be tightly controlled and may be suitable for high temperature and high pressure fluids. Further, fins may be easily created and aid in reducing temperatures during operation; by reducing the temperatures of key components in the engine during operation a given engine may be made more powerful, more efficient, more reliable, and longer-lasting.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a heat exchanger from a metal body made from a material having a melting temperature greater than 660° C., with the metal body having opposing first and second surfaces, the method comprising:
    forming at least one fluid passageway in the metal body by:
        cutting an access opening into the first surface of the metal body and fully forming the access opening with the fully formed access opening spanning a final width dimension of the first surface;
        removing material from the metal body along the fully formed access opening to form a fluid passageway in the metal body that extends along the access opening and is accessible through the fully formed access opening; and
        closing the fully formed access opening to fully form the fluid passageway; and
    forming at least one fin projecting from the second surface by forming a plurality of nicks on the second surface, introducing a skiving blade into the plurality of nicks, and advancing the skiving blade into the material to form a fin that remains attached to the metal body;
    wherein fluid may be passed through the fluid passageway and heat from the fluid may be dissipated through the at least one fin.

2. The method of claim 1 wherein removing the material comprises passing an EDM wire through the access opening and cutting the material with the EDM wire.

3. The method of claim 2 wherein cutting the access opening comprises cutting the access opening with the EDM wire.

4. The method of claim 3 wherein cutting the material with the EDM wire comprises moving the EDM wire to a middle area of the fluid passageway and moving the EDM wire in a path that increases in distance from the middle area.

5. The method of claim 1 wherein the removing material comprises removing sufficient material such that the fluid passageway has a cross section greater than the access opening.

6. The method of claim 5 wherein the cross section is substantially circular.

7. The method of claim 1 wherein closing the fully formed access opening comprises attaching a metal closing element to the first surface.

8. The method of claim 7 wherein attaching the metal closing element to the first surface comprises brazing the metal closing element to the first surface.

9. The method of claim 1 wherein forming the at least one fin includes forming a plurality of fins.

10. The method of claim 9 wherein forming the plurality of fins comprises forming a row of fins on multiple projections extending from the metal body.

\* \* \* \* \*